July 2, 1968  J. V. SAVAGE  3,390,842

WEB TAKEUP APPARATUS

Filed Aug. 22, 1966  4 Sheets-Sheet 1

INVENTOR
JOHN VIVIAN SAVAGE
BY
*McGlew and Toren*
ATTORNEYS

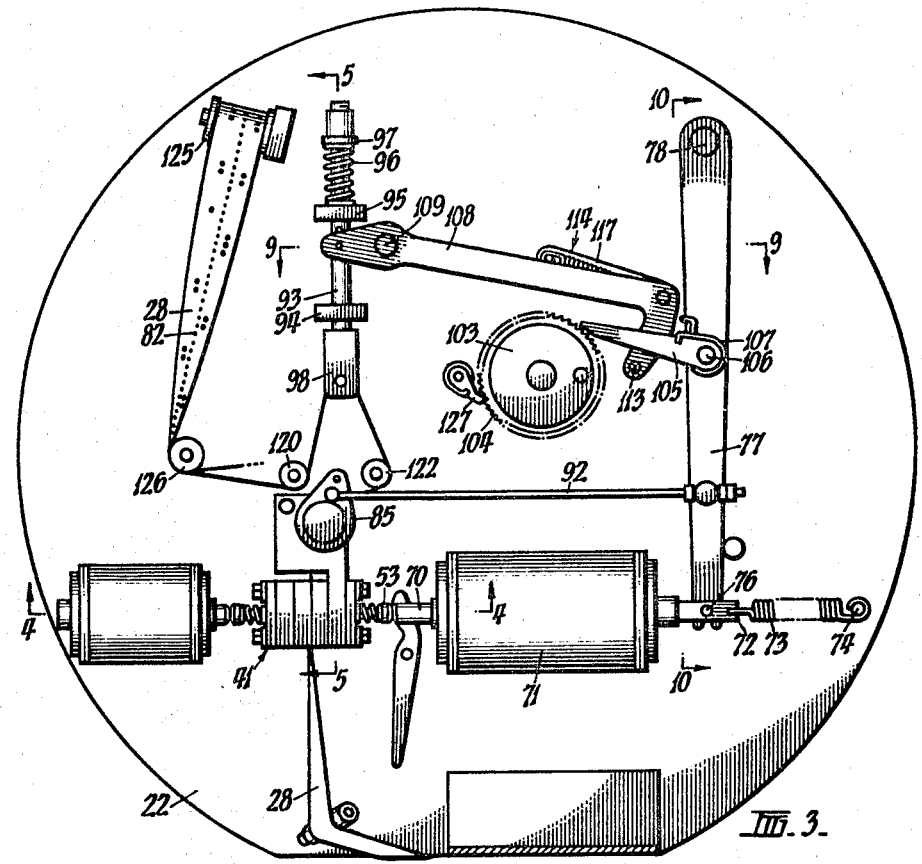

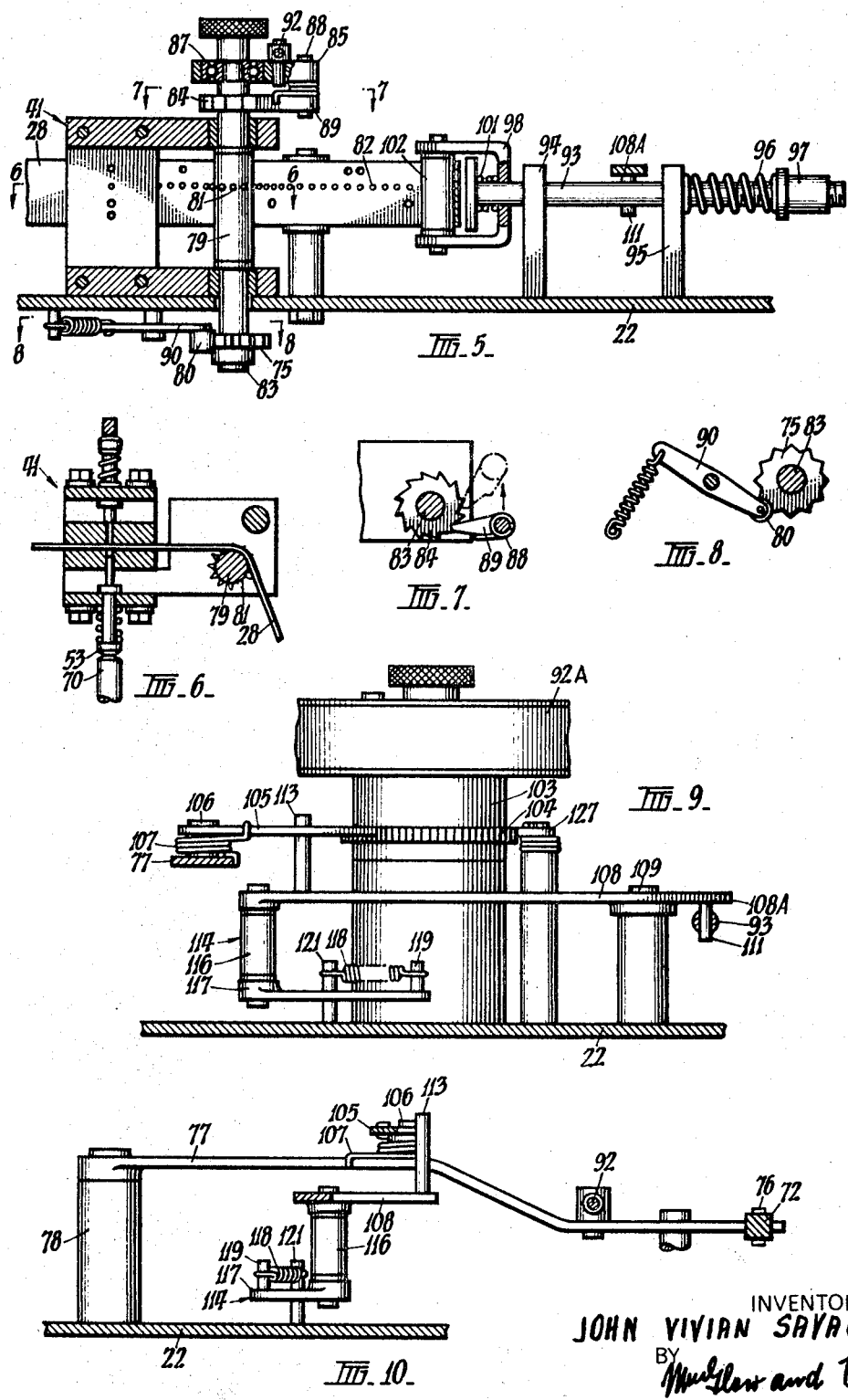

July 2, 1968  J. V. SAVAGE  3,390,842
WEB TAKEUP APPARATUS
Filed Aug. 22, 1966  4 Sheets-Sheet 4

INVENTOR
JOHN VIVIAN SAVAGE
BY
ATTORNEYS

3,390,842
WEB TAKEUP APPARATUS
John Vivian Savage, 14 Garling St., Lyneham, Canberra, Australian Capital Territory, Australia
Filed Aug. 22, 1966, Ser. No. 573,933
Claims priority, application Australia, Aug. 23, 1965, 63,104/65
5 Claims. (Cl. 242—67.2)

ABSTRACT OF THE DISCLOSURE

An apparatus for advancing a web of paper or the like provided with longitudinally spaced sprocket holes and for winding the web onto a takeup spool, is comprised of a combination of elements for moving the web, for tensioning the web during its movement between a punching head and a takeup spool and for periodically activating the takeup spool for winding the web thereon. A rotatable sprocket having teeth for engaging the sprocket holes in the web is supplied with driving means for intermittently rotating the sprocket and advancing the web. The takeup spool for the web is rotatably supported and also is provided with drive means periodically operable for rotating the spool to takeup the web advanced by the rotation of the sprocket. A web guide assembly is disposed between the sprocket and the takeup spool and includes biasing means for moving the web guide in one direction to tension the web as it is periodically moved forward by the sprocket between the intermittent operation of the takeup spool. When the web guide reaches a predetermined position in tensioning the web a control means including a lever moves the takeup spool into an operable position so that the web may be wound onto the spool. A solenoid is provided for operating the punching head and in addition a lever arm is connected to the solenoid and a connecting rod extends from the lever arm to the sprocket drive means whereby each operation of the solenoid is imparted through the lever to the sprocket drive means for moving the web toward the web guide and subsequently onto the takeup spool. The lever arm connected to the solenoid also supports a pawl which in its operative positon rotates the takeup spool. A control arrangement extends from the web guide to the pawl whereby the pawl is maintained in a disengaged position from the takeup spool until the web guide has been moved into its predetermined position by its biasing means in the course of tensioning the web. When this position is reached the takeup spool is actuated and under the operation of the solenoid acting through the lever arm the spool takes up the web held by the web guide, and the web guide is returned to its first position and continues to tension the web.

Summary of the invention

This invention relates to apparatus for winding a web onto a takeup package.

The invention has particular, but not exclusive, application to machines or instruments in which a web must be advanced in accurately controlled discrete increments. For example, in many automatic event recording instruments, a web of paper is advanced incrementally at regular time intervals and a record is made by punching holes in the web or by marking the web with a stamp or pen. In such instruments, the web is usually advanced by one or more feeding sprockets which engage sprocket holes punched at regular intervals along the web. In order accurately to control the incremental advances of the web, a reasonably uniform tension must be maintained in the web on the output side of the feeding sprocket or sprockets.

It is an object of this invention to provide an apparatus for winding onto a takeup package a web which is advanced by feeding means whereby a reasonably uniform tension may be maintained in the web on the output side of the feeding means.

According to the invention there is provided apparatus for winding onto a takeup package a web advanced by feeding means, comprising a web guide to engage the web between the feeding means and the takeup package, biasing means biasing the web guide in one direction, takeup package drive means, and control means interconnected with the web guide and said drive means such that normally the drive means is inoperative and the biasing means moves the web guide in one direction to accommodate increases in the length of the web between the feeding means and the takeup package but when the web guide reaches a predetermined position the control means renders said drive means operable to rotate the takeup package causing the web to be taken onto that package and the web guide to be drawn by the web in the opposite direction.

Preferably the web guide is mounted on a plunger and the biasing means comprises a compression spring acting on the plunger.

The takeup package drive means may be operably connected to the feeding means so that when it is rendered operative by the control means it operates simultaneously with the feeding means. It may comprise a drive shaft for the takeup package, ratchet teeth on the shaft, a pawl member which is movable on operation of the feeding means and is engageable with the ratchet teeth in such a manner that its movement will cause rotation of the shaft but which is normally held out of engagement with the teeth by the control means.

The control means may comprise a lever pivotally mounted between its ends, one end of the lever engaging the plunger and the other end engaging the pawl member.

In order that the invention may be more fully explained, one presently preferred form of apparatus which has been designed for installation in a digital event recorder will now be described in detail with reference to the accompanying drawings in which:

FIGURE 3 is a plan view of certain components mounted on a platform of the recorder;

FIGURE 4 is a section on the line 4—4 in FIGURE 3;

FIGURE 5 is a section on the line 5—5 in FIGURE 3;

FIGURE 6 is a section on the line 6—6 in FIGURE 5;

FIGURE 7 is a section on the line 7—7 in FIGURE 5;

FIGURE 8 is a section on the line 8—8 in FIGURE 5;

FIGURE 9 is a section to an enlarged scale on the line 9—9 in FIGURE 3;

FIGURE 10 is a section to an enlarged scale on the line 10—10 in FIGURE 3;

Figure 1:
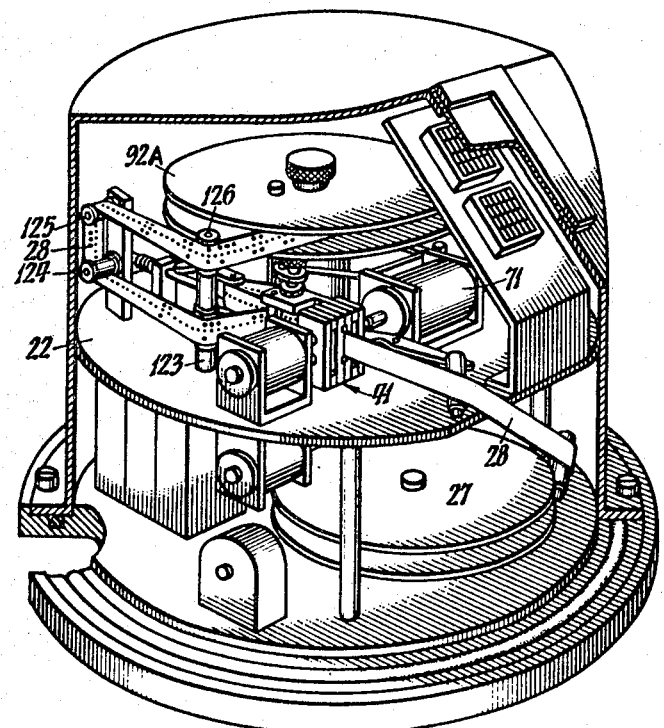
FIGURE 1 is a cut-away perspective view of the event recorder which records events by punching holes in paper tape and incorporates a web takeup apparatus according to this invention for winding the tape onto a takeup spool.
Figure 2:
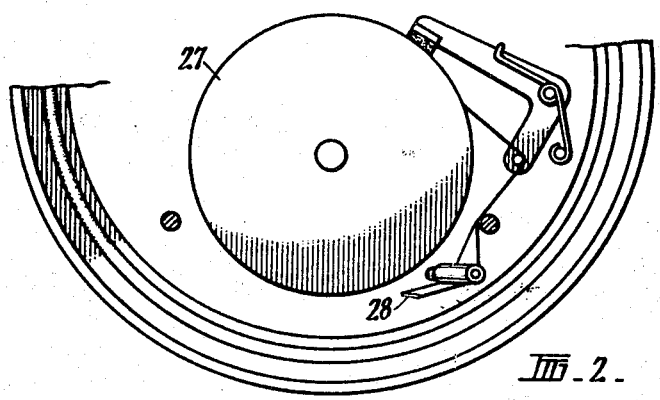
FIGURE 2 is a plan view of a tape delivery spool, an associated spool braking device and part of a base plate of the recorder illustrated in FIGURE 1.

The illustrated recorder is fully described in copending Australian patent application No. 63,082/65. In this instrument, standard five-lever data recordal paper tape 28 is passed from a delivery spool 27 through a punching head 41 mounted on a horizontal platform 22. Periodically, sprocket holes are punched in tape 28 by a punch 53 operated by energisation of a solenoid 71, the plunger 70 of which extends transversely of the tape 28 in punching head 41. One end of solenoid plunger 70 is extended in the form of a flat bar 72 and a helical tension spring 73 is fastened between the end of this bar and a fixed peg 74 to bias the plunger toward a retracted position. The end of bar 72 carries a pin 76 which fits into the forked forward end of a rearwardly extending lever arm 77 which is pivotally mounted at its rear end on a post 78 at the rear of platform 22 so that movement of plunger 70 causes lever arm 77 to pivot about post 78.

The constructional and operational details of punching head 41 are fully described in the above-mentioned copending patent application and are not relevant to the present invention. Suffice to say that solenoid 71 operates periodically to cause sprocket holes to be punched in the tape and information holes are also punched in the tape by other punches mounted in the punching head. A vertical roller 79 is mounted at the rear end of punching head 41 and is provided with sprocket teeth 81 at the correct height to engage holes 82 punched in the tape by sprocket punch 53. Roller 79, which will be termed the sprocket roller, is fixed to a vertical shaft 83 which carries a ratchet wheel 84 and a cam-shaped member 85. Ratchet wheel 84 is fixed to the shaft whereas cam-shaped member 85 is journalled on the shaft by means of a ball bearing 87. A pin 88 depends from the tip of cam-shaped member 85 and carries at its lower end a pawl 89 which is biased into engagement with the teeth of ratchet wheel 84. A connecting rod 92 extends transversely of platform 22 and is pivotally connected at one end to cam-shaped member 85 and at its other end to lever arm 77.

When sprocket hole solenoid 71 is energised, the movement of its plunger 70 not only operates sprocket punch 53 but it also causes lever arm 77 to pivot about post 78. This causes connecting rod 92 to rotate cam-shaped member 85 on the shaft 83. When, on de-energisation of solenoid 71, tension spring 73 draws solenoid plunger 70 back to its retracted position, the consequent return pivoting of lever arm 77 causes connecting rod 92 to draw cam-shaped member 85 back to its original position. During this return motion, the engagement of pawl 89 with the teeth of ratchet 84 rotates shaft 83 and sprocket roller 79 to advance the tape through 1/10". The lower end of shaft 83 extends through a hole in platform 22 and carries a notched indexing wheel 75 which is engaged by a roller 80 at the end of a spring loaded lever 90. This prevents movement of the sprocket roller until sprocket punch is withdrawn from the tape and ensures that the tape is advanced in exact increments. Thus, each time that sprocket hole solenoid 71 operates, a sprocket hole 82 is punched in the tape and the tape is then advanced through exactly 1/10".

A web takeup apparatus according to the invention is incorporated in the instrument to wind the tape which is fed forward intermittently by the feed sprocket onto a takeup spool 92A and to maintain a uniform tension in the tape. This takeup apparatus comprises a rearwardly extending tape tensioning plunger 93 which is located rearwardly of the punching head and is slidably mounted in holes in a pair of lugs 94, 95 fastened to platform 22. Plunger 93 carries a helical compression spring 96 which acts on lug 95 and an adjustable rear end cap 97 to bias the plunger rearwardly. A channel-shaped head piece 98 is slidably mounted on the forward end of plunger 93 with its open mouth facing forwardly and is spring loaded by means of a secondary compression spring 101. A vertical tape guide peg 102 extends between the flanges of headpiece 98 at its forward end.

Figure 11:
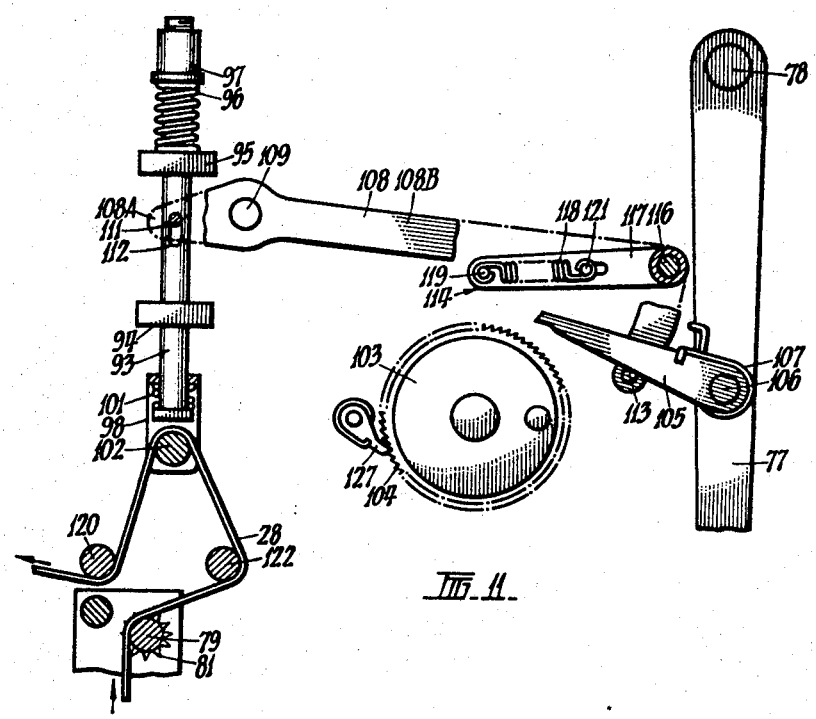
FIGURE 11 is a partly broken and sectioned plan view, to an enlarged scale, of a number of components of the web takeup apparatus.
Figure 12:
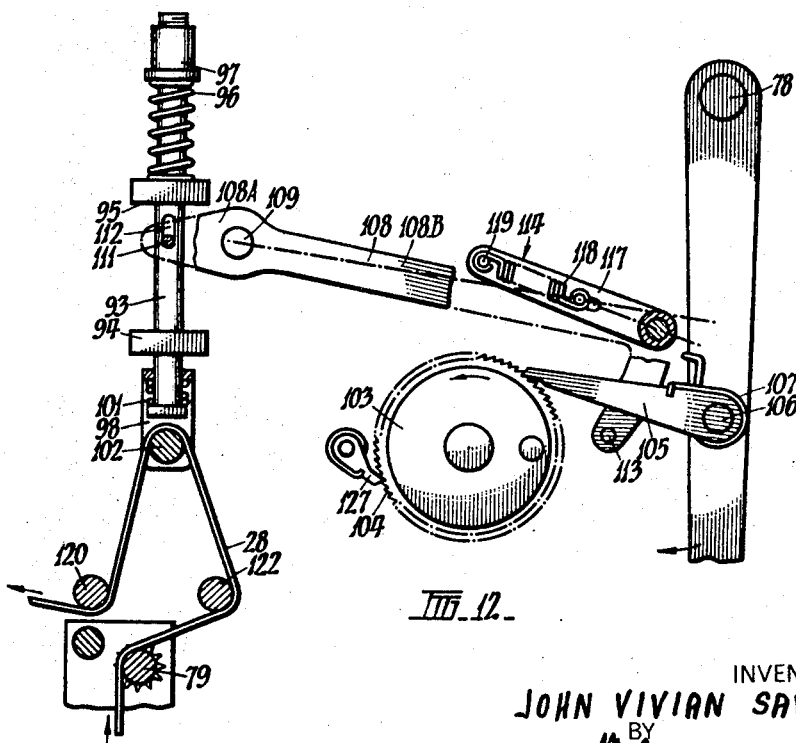
FIGURE 12 is a plan view of the same components as are illustrated in FIGURE 11, but shows the condition of these components during a different stage of the operation of the web takeup apparatus.

Takeup spool 92A is connected to the upper end of a vertical shaft 103 which is rotatably mounted on platform 22 and is provided with ratchet teeth 104. A long pawl member 105 is pivotally mounted on a pin 106 on lever arm 77 and is spring loaded by a coil spring 107 toward engagement with ratchet teeth 104 on spool shaft 103. However, it can be held out of engagement with ratchet teeth 104 or allowed to engage therewith according to the position of a control lever 108 which is pivotally mounted on a post 109 adjacent tensioning plunger 93. Lever 108 has a relatively short arm 108A provided at its end with a pin 111 which slidably engages a longitudinal slot 112 in plunger 93 and, on the other side of post 109, a cranked arm 108B which turns under long pawl member 105 and carries an upwardly extending pin 113 which engages an edge of pawl member 105. Control lever 108 is movable between a first position as illustrated in FIGURE 11 in which it holds pawl member 105 out of engagement with ratchet teeth 104 and a second position as illustrated in FIGURE 12 in which pawl member 105 can be forced by spring 107 into engagement with those teeth. A spring loaded "over-centre" detent mechanism denoted generally as 114 is attached to control lever 108 to hold it in place when moved to either of these positions. This mechanism comprises a peg 116 depending from lever 108 and carrying an arm 117. A helical tension spring 118 is connected between a peg 119 at the end of arm 117 and another peg 121 which is fixed to platform 22 in such a position that lever 108 passes over it in moving between its first and second positions.

Tape 28 is threaded from sprocket roller 79 around a guide post 122 to guide peg 102 at the forward end of tensioning plunger 93. The tape is passed around peg 102 with an angle of wrap approximately 120° and is then passed around four fixed guides 123, 124, 125, 126, and finally onto the takeup spool 92A.

As described above, tape 28 is advanced intermittently by the action of connecting rod 92, cam-shaped member 85, pawl 89 and ratchet 84 consequent to each operation of sprocket hole solenoid 71. The takeup mechanism operates to maintain a uniform tension on the punched tape. This tension is maintained by the springs 96, 101 of the tensioning plunger. At one stage of the cycle of operation of the takeup mechanism, plunger 93 is in a forward position as shown in FIGURE 11 with its main biasing spring 96 compressed and control lever 108 in a position in which it holds long pawl member 105 out of engagement with ratchet teeth 104 with pin 111 adjacent the rear end of the longitudinal slot 112 in the plunger. As tape 28 is fed intermittently from sprocket roller 79, tensioning plunger 93 is moved rearwardly by spring 96 to maintain a constant tension on the tape. Slot 112 in the plunger therefore moves with respect to pin 111 and the movement of the plunger allows constant tension to be maintained during several operations of sprocket hole punch 53. During this part of the cycle, control lever 108 is held by the spring loaded "over-centre" mechanism 114 against the action of the spring loading of pawl member 105. Tensioning plunger 93 moves rearwardly until it reaches a position where the forward end of its slot 112 engages pin 111. When this engagement occurs, control lever 108 is pivoted by the rearward movement of tensioning plunger 93 into the position shown in FIGURE 12 in which it allows pawl member 105 to be forced by its coil spring 107 into engagement with ratchet teeth 104 so that on the next operation of sprocket hole solenoid 71 the pivotal movement of lever arm 77 causes pawl member 105 to rotate the takeup spool shaft 103. A second spring loaded pawl 127 engages ratchet teeth 104 to prevent reverse rotation of the takeup spool shaft. The rotation of takeup spool 92 causes more tape to be taken onto it than is fed forward by sprocket roller 79 so that the tape draws tensioning plunger 93 forward. The plunger is drawn forward until the rear end of slot 112 engages pin 111 on control lever 108 and forces the control lever back to the position in which it holds pawl member 105 out of engagement with ratchet teeth 104. Depending on the amount of tape on takeup spool 92A, i.e., the effective diameter of the takeup platform, this may require one or more strokes of the sprocket hole solenoid plunger 70. The secondary plunger spring 101 takes up movement of the plunger 93 which is in excess of that required to move control lever 108 into its holding position and thus allows sprocket hole solenoid plunger 70 to complete an integral number of strokes. The takeup mechanism is now in its original condition so that the plunger can again move rearwardly to maintain uniform tension in the tape and the complete cycle of operation is repeated.

The above described takeup apparatus and its installation in a digital event recorder have been given by way of example only. Apparatus according to the invention may be installed in many other types of recording instruments or in industrial machines in which a web must be advanced accurately. Such apparatus may, for example, have application in the printing industry. The actual constructional details of the apparatus may vary considerably according to the particular application. For example, a ratchet and pawl device was utilized in the above described apparatus to drive takeup spool shaft 103 since such a device could be operated by the motion of solenoid plunger 70 and lever arm 77, which were also required for other purposes. However, alternative drive means could be employed. This means could be electrically operated in which case the control means could conveniently be an electric circuit incorporating a switch operable by movement of the tensioning plunger. It is accordingly to be understood that many modifications and adaptations may be made to the takeup apparatus which has been illustrated and described in detail herein without departing from the spirit and scope of the invention.

I claim:

1. Apparatus for advancing a web provided with longitudinally spaced sprocket holes and winding the web onto a takeup package, comprising a rotatable web feed sprocket having teeth which engage the sprocket holes in the web, sprocket drive means for intermittently rotating said sprocket thereby to advance the web, means for rotatably supporting the takeup package, takeup package drive means operable to rotate the package and cause the web advanced by rotation of the sprocket to be taken onto that package, a web guide to engage the web between said sprocket and the takeup package, biasing means biasing the web guide in one direction, and control means interconnected with said web guide and the takeup package drive means such that normally the takeup package drive means is inoperative and the biasing means moves the web guide in said one direction to accommodate increases in the length of the web between said sprocket and the takeup package but when said web guide reaches a predetermined position said control means renders the takeup package drive means operable to rotate the takeup package so causing the web to be taken onto that package and the web guide to be drawn by the web in the direction opposite to said one direction, and wherein said sprocket drive means comprises a ratchet wheel rotatable with the sprocket, a member rotatable about the axis of rotation of the ratchet wheel, a pawl pivotally mounted on said member for engagement with said ratchet wheel, a lever arm pivotable about a fixed axis, means intermittently actuated to pivot the lever arm about the said fixed axis in a forward direction and then back in a reverse direction, and a connecting rod connecting the lever arm with the pawl carrying member whereby, on pivoting of the lever arm in said forward direction the pawl carrying member is rotated with respect to the ratchet wheel and on the reverse pivoting of the lever arm the engagement of the pawl with the ratchet causes the ratchet wheel and therefore the lever to rotate with the pawl carrying member.

2. Apparatus as claimed in claim 1, in which said takeup package drive means comprises a drive shaft for the takeup package, ratchet teeth on said drive shaft, a pawl member which is pivotally mounted on said lever arm and is engageable with the ratchet teeth on said drive shaft in such a manner that forward pivoting movement of said lever arm will cause rotation of the shaft but which is normally held out of engagement with the ratchet teeth on the drive shaft by said control means.

3. Apparatus as claimed in claim 2, in which said web guide is mounted on a plunger, said biasing means biases the plunger in said one direction and the control means comprises a control lever pivotally mounted between its ends, one end of the control lever engaging the plunger and the other end normally engaging the pawl member to hold it out of engagement with the ratchet teeth on said drive shaft and wherein the lever is pivoted by movement of the plunger in said one direction to a position in which its said other end is displaced to allow the pawl member to engage the ratchet teeth on said drive shaft.

4. Apparatus for advancing a web provided with longitudinally spaced sprocket holes and winding the web onto a takeup package, comprising a rotatable web feed sprocket having teeth which engage sprocket holes in the web, sprocket drive means for intermittently rotating said sprocket, takeup package drive means for rotatably supporting the takeup package, a drive shaft for the takeup package, ratchet teeth on said drive shaft, a pawl member engageable with the ratchet teeth on the drive shaft, pawl member drive means intermittently actuated to move the pawl member such that it will cause rotation of the drive shaft when engaged with the ratchet teeth on the drive shaft thereby to cause rotation of the takeup package so as to cause the web advanced by the sprocket to be taken onto the package, a plunger, biasing means biasing the plunger in one direction, a web guide mounted on the plunger to engage the web between said sprocket and the takeup package, a control lever pivotally mounted between its ends about a fixed axis and an operable connection between one end of the control lever and the plunger to permit only limited relative movement between them, and wherein normally the other end of the control lever engages the pawl member to hold it out of engagement with said ratchet teeth and the biasing means moves the plunger in said one direction and through its range of limited movement relative to said one end of the control lever thereby to accommodate increases in length of the web between the sprocket and the takeup package but when the plunger has thus been moved to one extremity of its limited movement relative to said one end of the control lever it pivots the control lever so that said other end of that lever is displaced to allow the pawl member to engage the ratchet teeth on the drive shaft causing the web to be taken onto the takeup package and the web guide and plunger to be drawn by the web in the opposite direction, the plunger thus being drawn to the other extremity of its range of limited movement relative to said one end of the control lever and then moving the control lever so as to move the pawl member out of engagement with the ratchet teeth.

5. Apparatus as claimed in claim 4, wherein there is further provided detent means releasably to hold the control lever both when the lever is in its normal position and when it is in its pivoted position.

References Cited

UNITED STATES PATENTS

| 911,236 | 2/1909 | Groebli | 242—56.8 |
| 2,055,785 | 9/1936 | Crowther | 242—67.1 |
| 2,568,431 | 9/1951 | Congdon | 242—67.1 |

WILLIAM S. BURDEN, *Primary Examiner.*